United States Patent [19]
Price

[11] Patent Number: 5,370,159
[45] Date of Patent: Dec. 6, 1994

[54] APPARATUS AND PROCESS FOR FAST FILLING WITH NATURAL GAS

[75] Inventor: Billy F. Price, Houston, Tex.

[73] Assignee: Price Compressor Company, Inc., Houston, Tex.

[21] Appl. No.: 94,495

[22] Filed: Jul. 19, 1993

[51] Int. Cl.$^5$ .......................... B65B 31/00; B67C 3/00
[52] U.S. Cl. .................................. 141/4; 141/18; 141/25
[58] Field of Search .......... 141/1, 4, 5, 18, 47, 141/49, 51, 2, 3, 25; 417/244; 137/234.6

[56] References Cited

U.S. PATENT DOCUMENTS

| | | | |
|---|---|---|---|
| 4,097,202 | 6/1978 | Price | 417/454 |
| 4,531,497 | 7/1985 | Smith | 123/525 |
| 4,966,206 | 10/1990 | Baumann et al. | 141/4 |
| 5,263,826 | 11/1993 | Baumann et al. | 417/310 |

OTHER PUBLICATIONS

Public Service Company of Colorado, Team NGV Natural Gas Vehicles Pamphlet (No available date).
Brochure of CNG Equipco (No available date).
*Industry News, Natural Gas Fuels,* Jan. 1993, pp. 6, 7, and 9.
*Industry News, Natural Gas Fuels,* vol. 1, Iss. 1, Aug. 1992, pp. 6-9.
Tri-Fuels Incorporated, Catalog at pp. 26, 52, and 53 (No available date).
Brochure of Natural Gas Resources, Inc. (No available date).
Brochure of Tri-Fuels Incorporated (No available date).

*Primary Examiner*—Henry J. Recla
*Assistant Examiner*—Steven O. Douglas
*Attorney, Agent, or Firm*—Pravel, Hewitt, Kimball & Krieger

[57] ABSTRACT

An apparatus and method for rapidly filling fuel tanks with natural gas from a large pressurized storage vessel utilizing a compressor having a cylinder dedicated to removal of natural gas from the storage vessel and supplying it to the fuel tanks while other compressor cylinders at least partially replenish the removed natural gas by charging compressed gas to the storage vessel. The gas removal cylinder and other cylinders are connected to a common drive shaft driven by a single motor. The apparatus and method provide for rapid fueling of large numbers of vehicles using natural gas while significantly reducing capital investment requirements.

9 Claims, 1 Drawing Sheet

APPARATUS AND PROCESS FOR FAST FILLING WITH NATURAL GAS

BACKGROUND OF THE INVENTION

1. Field of the Invention

The invention provides an apparatus and method to enhance the delivery rate of natural gas from large storage containers. More particularly, the invention provides a compressor with an evacuator cylinder that delivers natural gas from a large storage facility to a customer while other cylinders of the compressor are used to refill the storage tank with natural gas commonly supplied by pipeline at low pressure.

2. Description of the Related Art

Due to increasing environmental concerns, vehicle manufacturers are under pressure to convert to motor fuels that produce lower amounts of pollutants. Carbon dioxide, a byproduct of the combustion of hydrocarbon fuels, is now considered as a pollutant insofar as this gas contributes to a "hot house effect" which is expected to significantly raise the general temperature of the Earth's environment with potentially disastrous consequences. One method of reducing the production of carbon dioxide has been to use hydrocarbon fuels that have a higher proportion of hydrogen relative to carbon. Natural gas is such a fuel. Therefore, there has been increasing pressure, due to environmental concerns, to convert entire fleets of vehicles so that they can consume natural gas rather than gasoline or diesel fuel.

Under usual conditions, natural gas is supplied by pipeline under low pressure to storage facilities. At the storage facility, the natural gas is compressed, using large compressors, into large storage vessels at pressures up to about 4,000–5,000 psi. Natural gas can then be dispensed from these large storage vessels into the fuel tanks of vehicles. However, as natural gas is removed from the storage vessel, the gas pressure in the vessel declined. As the pressure in the vessel declined, the rate of discharge of natural gas from the large pressure vessel to the fuel tank also declined, especially since the vehicle fuel tanks must be filled to a pressure of at least about 2,400 psi or higher as required. Therefore, storage vessels have so far as known only been capable of supplying gas at a declining rate of flow, as the pressure gradually dropped and approached the vehicle tank pressure. This declining and overall relatively slow rate of filling user vehicles has been a significant impediment to the conversion of vehicles to the use of natural gas since filling a vehicle under these conditions could take several hours.

In order to overcome the slow filling rate obstacle, "fast-fill cascade" systems have been developed. However, these systems also have limitations. In a fast-fill cascade system, natural gas has been supplied via a compressor to a series of compressed gas storage cylinders. These storage cylinders have been initially charged at high pressure, typically about 3,600 psi. The vehicle requiring a refill of fuel was hooked up to one of these compressed gas cylinders. Once the gas in that particular one of the cylinders dropped below a certain pressure or required feed rate, the cylinder was taken out of service. A second cylinder in the series was then brought into service to provide fuel. This cylinder operation was designed to be carried out automatically by controlled valves so that there was a relatively continuous flow of fuel to the vehicle. However, fast-fill cascade systems of this type have been expensive, requiring large numbers of high pressure gas cylinders and associated valving and controls. Further, in order to fuel a large fleet of vehicles, such as the buses for a typical large metropolitan area's metropolitan transit system, a vast number of fast-fill cascade high pressure cylinders would be required. This would require a substantial capital investment. This situation is made worse by the fact that the capital investment is not normally economically justifiable, but is necessitated by environmental concerns. Gasoline or diesel fuel is virtually always cheaper.

There has existed a need for a capability of rapidly fueling vehicles with compressed natural gas (CNG) or vapors from liquid natural gas (LNG) with a short fueling time per vehicle. Further, the means should desirably require relatively low capital investment while meeting safety and environmental standards.

SUMMARY OF THE INVENTION

The present invention provides an apparatus and process capable of rapidly fueling vehicles with natural gas, while providing short vehicle fueling times. As used in connection with the present invention, the term "natural gas" refers to commercial methane, as is commonly understood, as well as vapors obtained from liquified natural gas.

The present invention is particularly useful in allowing the fueling of vehicle compressed natural gas receiving in a time that approximates the time for fueling a vehicle with conventional gasoline or diesel tanks. Thus, the invention provides the capability to overcome a major factor discouraging the conversion of vehicles to the use of natural gas, namely the length of time needed to refuel. Further, from the natural gas suppliers' point of view, the invention provides an apparatus that is relatively low cost and simple to operate so that ordinary refueling attendants or consumers may use the natural gas refueling facility with ease.

In the present invention, natural gas is compressed into a large storage vessel utilizing a compressor. This storage vessel is maintained at typical natural gas high pressures. According to the present invention, the storage vessel is replenished with compressed natural gas while natural gas is being withdrawn and charged into vehicles requiring natural gas fuel. In order to achieve this, the invention provides a compressor with an "evacuator cylinder" and other cylinders, all on a common shaft driven by a common motor. In operation, the evacuator cylinder draws natural gas from the storage tank and compresses it into the vehicle's fuel tank. Other cylinders, of the same compressor, simultaneously withdraw gas from a natural gas source, such as a pipeline, and compress this gas into the storage vessel. Thus, the storage vessel is being replenished while the vehicle is being fueled. Since the other cylinders of the compressor may be designed so that the rate of natural gas addition to the storage vessel equals or nearly equals the rate of natural gas evacuation from the storage vessel, the back pressure on the evacuator cylinder is either maintained constant or declines relatively slowly, compared with systems that do not provide for refill of the storage vessel. This leads to a constant or slowly declining fueling rate from the storage vessel, through the evacuator cylinder, to the vehicle being fueled. Since the pressure in the storage vessel is maintained at a higher level than in previous systems, the fueling rate of the vehicle is maintained at a high rate during the fueling operation relative to previous systems.

The invention provides a relatively inexpensive method for dramatically reducing the fueling time for vehicles, particularly in large fleets or in a commercial natural gas service station, by utilizing a new and improved compressor that has an evacuator cylinder for fueling vehicle tanks and other cylinders which are simultaneously utilized to replenish the storage vessel and maintain pressure in the storage vessel.

DETAILED DESCRIPTION OF THE PREFERRED EMBODIMENTS

Figure 1:
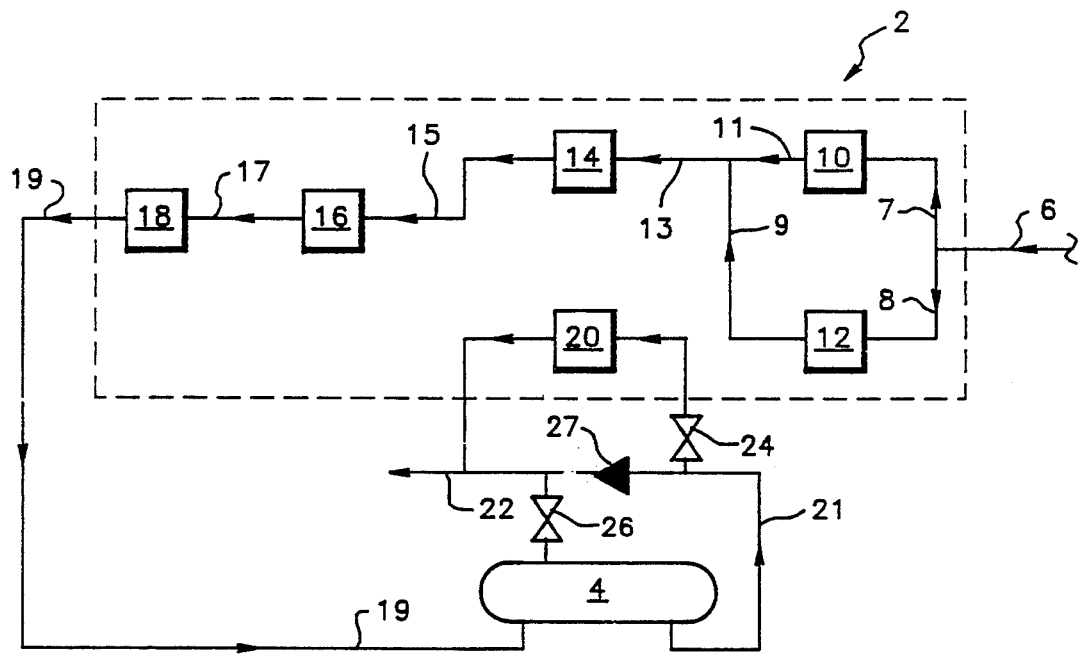
FIG. 1 is a schematic process flow diagram of a fast fueling system according to the present invention.

The invention rapid fueling system for supplying natural gas to fleets of vehicles may be better understood with reference to FIG. 1, which is exemplary of the invention. From FIG. 1, natural gas is supplied at relatively low pressure (about 5 psi) through conduit 6 to the suction of compressor 2. Compressor 2 has cylinders 10, 12, 14, 16, 18, and 20, all driven by a common drive shaft (not shown) and a common motor (not shown) drives the shaft. At the suction side of the first stage of compressor 2, conduit 6 supplies natural gas to the suction of compressor cylinders 10 and 12 through suction feed lines 7 and 8, respectively. The pressure of this natural gas is increased by compression through first stage cylinders 10 and 12 up to about 45 psi in the discharge lines from these cylinders, 11 and 9, respectively. In this instance, compressor 2 is a modified compressor, wherein discharge lines 9 and 11 are united into line 13, the suction line to second stage cylinder 14. Second stage cylinder 14 compresses the natural gas further to about 250 psi and discharges this compressed gas into line 15. Line 15 is effectively the suction line for third stage compressor cylinder 16. Compressor cylinder 16 further compresses the natural gas to about 1,000 psi and discharges this compressed gas into line 17. Finally, line 17 is the suction line to the fourth compressor stage, cylinder 18, which further compresses the gas up to about 4,000 psi, the desired pressure of the storage tank 4. This compressed gas then flows from fourth stage cylinder 18 through line 19 to the storage cylinder 4.

During this filling of the storage tank 4, valves 24 and 26 are open so that cylinder 20 is in "balanced condition" not using compressing energy.

It should be understood that the above description of the compressor is exemplary and that compressors with fewer or more stages or cylinders may be utilized and that stage discharge pressures may be different than herein disclosed, as necessary and desired.

When fuel is demanded by a customer, valve 26 is opened and compressed gas free-flows from fully charged storage tank 4 to the customer's fuel tank through conduit 22. Check valve 27 prevents bypass of the fuel to conduit 21. When storage tank 4 pressure declines to a point that the fueling rate to the vehicle fuel tank is below an acceptable level (depending upon the pressure differential between the storage tank 4 and the vehicle fuel tank), valve 26 closes and valve 24 opens so that natural gas is withdrawn from storage tank 4 through line 21 into the suction of evacuator cylinder 20 (in this instance a second stage cylinder of compressor 2 but a cylinder in another stage could also be utilized, as required) which compresses the gas further up to 4,000 psi and discharges this gas through line 22 into the fuel tank of the vehicle. While natural gas is being withdrawn for fueling the vehicle, the other cylinders of the compressor (10, 12, 14, 16, and 18), as explained above, withdraw gas from the fuel supply line 6 and compress this gas into the storage tank 4 through line 19. Thus, the simultaneous fueling of a vehicle and replenishment of storage tank 4 occurs.

In some instances, the compressor 2 is preferably designed so that the amount of gas compressed and charged to the storage vessel through line 19 is about equal to the amount of gas being withdrawn from the storage vessel through line 21 and charged to the vehicle fuel tank via evacuator cylinder 20. However, in other instances, this may not be necessary so long as an adequate fueling rate is available at the end of a fueling run when the last vehicles are being fueled. Therefore, the amount of gas in storage vessel 4 may gradually decline as natural gas is being withdrawn. However, the rate of decline of natural gas pressure in storage vessel 4 will be significantly slower than the rate of decline if there had not been any replenishing of natural gas via compressor 2 through line 19. Thus, the storage vessel is maintained at a significantly higher pressure throughout a fueling cycle than it would have been, had there been no resupply and the vessel 4 is able to provide a higher suction pressure to evacuator 20 thereby ensuring a higher filling rate through line 22 into vehicle fuel tanks.

The invention overcomes a major factor discouraging the conversion of vehicles from gasoline or diesel to natural gas: the time for fueling the vehicle. Whereas a gasoline or diesel car with a 15 gallon tank can be refueled in about 3 to about 4 minutes, previous natural gas delivery systems (aside from the cascade system) could not deliver fuel at such a rate. The present invention provides the capability to refuel a tank with a charge of natural gas which is the BTU (energy) equivalent of 15 gallons of gasoline in about 2 minutes. Further, it does not have the disadvantages of the cascade system, explained above.

To further understand the present invention, several examples are given. The following examples are illustrative of the operating principles according to the present invention. It should be understood, however, that they do not in any way limit the scope of the invention as described above and claimed below.

EXAMPLE 1

A prototype four-stage compressor with an evacuator cylinder was constructed. This four-stage compressor was substantially as shown in FIG. 1 and was used to charge a storage tank and to fill receiving tanks. To charge a storage tank, the first stage, consisting of two cylinders, compressed natural gas from an inlet pressure of about 5 psi up to a discharge pressure of about 45 psi. The second stage, consisting of one cylinder, compressed the first stage discharge up to a pressure of about 250 psi. The third stage of the compressor, consisting of one cylinder, further boosted the pressure to about 1,000 psi. Finally, the fourth stage increased pressure up to about 4,000 psi into the storage tank.

During charging of the storage tank, the evacuator cylinder is in balanced pressure condition and does not participate in storage vessel charging. Thus, valves 24 and 26 are open.

When refueling of a vehicle fuel tank is required and storage tank pressure is below 3,200 psi, valve 26 was closed and gas was removed from the storage tank, compressed by the evacuator cylinder to about 4,000 psi and discharged to the vehicle fuel tank. When storage tank pressure is above about 3,200 psi but below 4,000 psi, then valve 26 is open and gas free-flows from the storage tank to the vehicle fuel tank without need for compression. When the storage tank is full, in this instance at about 4,000 psi, then the compressor is shut down and vehicle tanks were refueled by free-flow of gas from the storage tank through open valve 26.

The evacuator cylinder, shown as 20 in FIG. 1, was able to boost pressure by up to 3,000 psi over its inlet pressure from a storage tank to a receiving tank. Further, the compressor was fitted with a safety feature so that when the inlet to the evacuator dropped to about 1,000 psi, then the evacuator cylinder reverted to a no load balanced condition with both valves 24 and 26 open until the pressure in the storage tank was restored.

The prototype compressor used a 125 horsepower drive motor and provided an average fueling rate of 4.5 gallons per minute for 25 minutes (representing energy usage of about 132,600 BTU, based on a 33.5 cubic foot storage tank charged to 4,000 psi which is the BTU equivalent of about 90 gallons of gasoline.

In comparison, without an evacuator cylinder, a 250 horsepower motor is required to provide the same average flow rate over the same time period (representing an energy usage of about 256,200 BTU).

EXAMPLE 2

Figure 2:
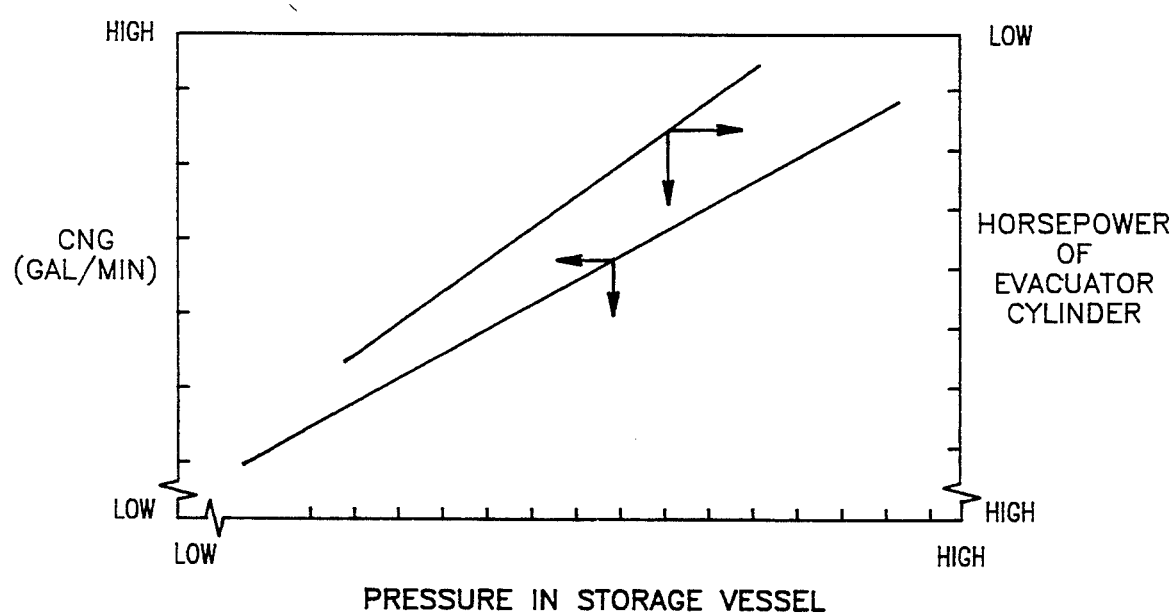
FIG. 2 is a schematic, not to scale, diagram illustrating the interrelation of natural gas delivery rate, evacuator cylinder suction pressure, and evacuator cylinder horsepower.

The operation of the compressor described in Example 1 and the system shown in FIG. 1 is further illustrated by FIG. 2, showing schematically and not to scale the variation of compressed natural gas delivery rate, pressure in the storage vessel, and horsepower demanded by the evacuator cylinder. From FIG. 2, as pressure in the storage vessel declines due to faster withdrawal of natural gas from the vessel by the evacuator cylinder than replenishment into the vessel by the other cylinders of the compressor, the compressed natural gas delivery rate in gallons per minute through the evacuator cylinder also declines. This is readily apparent because the suction pressure available for the evacuator cylinder reduces as the pressure in the storage vessel reduces. Further, the horsepower demanded by the evacuator cylinder also logically increases because the suction pressure is lower while the discharge pressure must be maintained at a required level.

Thus, for a four-stage compressor, as described in Example 1, when the pressure in the vessel is about 3,000 psi, and the evacuator cylinder uses about 12 horsepower, then the delivery rate of CNG at 4,000 psi is about 7 gpm. When the pressure in the pressure vessel declines to about 2,000 psi, then the evacuator cylinder delivers about 5 gpm at 4,000 psi and uses about 15 horsepower.

The variation of evacuator delivery rate (the fueling rate) with storage vessel pressure and the evacuator's horsepower requirement is shown in FIG. 2. From such a diagram, the average fueling rate can be estimated. The evacuator, in this instance, shuts down when the storage vessel's pressure (evacuator cylinder suction pressure) drops to 1000 psi. Thus, the average rate needed can be used to size the storage tank and determine its maximum pressure to achieve a required average fueling rate from a compressor according to the present invention. This data can also be used to size an evacuator cylinder and determine its horsepower as well as sizing the other cylinders and determining their horsepower requirements.

Although the invention has been described with reference to its preferred embodiments, such as flow rates of natural gas, horsepower of compressors, and the like, those of ordinary skill in the art may, upon reading this disclosure, appreciate changes and modifications which may be made to the apparatus and process which do not depart from the scope and spirit of the invention as described above and claimed below.

What is claimed is:

1. A system for rapidly fueling a tank with pressurized natural gas, the system comprising:
   a storage vessel capable of withstanding typical compressed natural gas pressures;
   a compressor means for supplying natural gas to the storage vessel, the compressor means comprising at least one evacuator cylinder and other compressor cylinders;
   a first conduit fluidically connecting the storage vessel to the compressor means; and
   a second conduit leading from the storage means to the evacuator cylinder of the compressor means, the evacuator cylinder able to receive natural gas through said second conduit from the storage vessel and compress the gas to a fuel tank at the same time that the other compressor cylinders compress natural gas to the storage vessel.

2. The system of claim 1, wherein the compressor means is a four stage compressor, and the evacuator cylinder is a second stage cylinder of the four-stage compressor.

3. The system of claim 1, wherein the evacuator cylinder is able to increase pressure of natural gas received from the storage vessel by about 3000 psi.

4. The system of claim 1, wherein the evacuator cylinder is able to receive natural gas from the storage vessel at a faster rate than the other cylinders supply natural gas to the storage vessel.

5. The system of claim 1, wherein the evacuator cylinder is able to compress natural gas at a fueling rate ranging from about 250 to about 800 cubic feet per minute.

6. A process for rapid fueling of tanks with pressurized natural gas, the process comprising:
   charging natural gas to a compressor having a plurality of compressor cylinders and at least one evacuator cylinder;
   simultaneously (a) compressing charged natural gas into a storage vessel from discharge ends of said compressor cylinders of the compressor, and (b) removing compressed natural gas from the storage vessel through a suction end of said at least one evacuator cylinder of the compressor;
   further compressing said removed compressed natural gas; and
   supplying the removed further compressed natural gas to a tank at a fueling rate.

7. The process of claim 6, wherein the charging comprises receiving natural gas from a supply pipeline.

8. The process of claim 6, wherein the compressing is compressing from about 5 to about 4,000 psi.

9. The process of claim 8, wherein the supplying at a fueling rate is supplying at a rate ranging from about 2.5 to about 7 gallons per minute.

* * * * *